(12) United States Patent
Kull et al.

(10) Patent No.: US 7,625,125 B2
(45) Date of Patent: Dec. 1, 2009

(54) SPINDLE MOTOR

(75) Inventors: Andreas Kull, Donaueschingen (DE); Martin Bauer, Villingen-Schwenningen (DE); Frank Drautz, Villingen-Schwenningen (DE)

(73) Assignee: Minebea Co., Ltd., Nagano-Ken (JP)

( * ) Notice: Subject to any disclaimer, the term of this patent is extended or adjusted under 35 U.S.C. 154(b) by 364 days.

(21) Appl. No.: 11/639,507

(22) Filed: Dec. 14, 2006

(65) Prior Publication Data
US 2007/0147716 A1  Jun. 28, 2007

(30) Foreign Application Priority Data
Dec. 23, 2005  (DE) .................... 10 2005 061 853

(51) Int. Cl.
*F16C 32/06* (2006.01)

(52) U.S. Cl. ........................... 384/107; 384/100

(58) Field of Classification Search ......... 384/100, 384/107–120; 310/90; 360/99.08, 98.07
See application file for complete search history.

(56) References Cited

U.S. PATENT DOCUMENTS 6,980,394 B2 * 12/2005 Inoue et al. ............... 384/112
2003/0099061 A1 * 5/2003 Bahirat et al. ............ 360/99.08
2004/0056547 A1   3/2004 Kull et al. ................... 310/91
2006/0017341 A1 * 1/2006 Hahn et al. .............. 360/99.08
2006/0133705 A1 * 6/2006 Nakamiya et al. .......... 384/107

FOREIGN PATENT DOCUMENTS

DE  10239650  3/2004

* cited by examiner

*Primary Examiner*—Thomas R Hannon
(74) *Attorney, Agent, or Firm*—Cooper & Dunham LLP (57) ABSTRACT

The invention relates to a spindle motor having a fluid dynamic bearing system used particularly for driving the storage disks of hard disk drives, having a baseplate, a stationary bearing bush disposed in an opening in the baseplate, a shaft rotatably supported in an axial bore in the bearing bush by means of the fluid dynamic bearing system, a hub connected to the shaft, and an electromagnetic drive system. In order to increase the stiffness of the motor system, according to the invention the bearing bush is provided with a flange that is fixed in the opening in the baseplate and whose outside diameter is distinctly larger than the outside diameter of the bearing bush. Instead of a flange at the outer diameter of the bearing bush there can be provided a sleeve at the base plate which receives the bearing bush at least partly.

16 Claims, 5 Drawing Sheets

SPINDLE MOTOR

TECHNICAL FIELD OF THE INVENTION

The invention relates to a spindle motor having a fluid dynamic bearing system as preferably used for driving hard disk drives.

PRIOR ART

A spindle motor essentially consists of a stator, a rotor and at least one bearing system arranged between these two parts. The electrically driven rotor is rotatably supported with respect to the stator by means of the bearing system. Fluid dynamic bearing systems are preferably employed as the bearing system.

A known embodiment of a spindle motor having a fluid dynamic bearing system is revealed in DE 102 39 650 B3. The spindle motor comprises a baseplate having a molded, substantially centrally disposed sleeve into which a bearing bush is inserted. The bearing bush has an axial bore to receive a shaft. The shaft rotates freely in the stationary bearing bush and forms a radial bearing together with the bearing bush. The mutually interacting bearing surfaces of the shaft and the bearing bush are spaced apart from each other by a thin, concentric bearing gap filled with a bearing fluid. A surface pattern is formed on at least one of the bearing surfaces which, due to the relative rotary movement between the shaft and the bearing bush, exerts local accelerating forces on the bearing fluid located in the bearing gap. A kind of pumping action is generated in this way resulting in the formation of a homogeneous lubricating film of regular thickness within the bearing gap which is stabilized by means of fluid dynamic pressure zones.

The shaft carries a hub on which, for example, one or more storage disks of a hard disk drive are disposed. Displacement of the above-described arrangement along the rotational axis is prevented by appropriately designed fluid dynamic axial bearings. The fluid dynamic axial bearings are preferably formed by the two end faces of a thrust plate preferably arranged at the end of the shaft, one of the end faces of the thrust plate being associated with a corresponding end face of the bearing bush and the other end face being associated with the inside end face of a cover. The cover forms a counter bearing to the thrust plate and seals the open end of the bearing system, preventing air from penetrating into the bearing gap filled with bearing fluid or from bearing fluid leaking out. In the bearing system presented here, a liquid bearing fluid, such as bearing oil, is used. An electromagnetic drive system is provided that comprises a stator arrangement disposed on the stationary part of the motor and a permanent magnet disposed on the hub.

DE 102 39 650 B3 reveals a single plate design (i.e. there is only one thrust plate) that is frequently used in hard disk drive motors, particularly for the common form factor of 3.5 inches. The motor consists of relatively few parts and functional components that are simple and cheap to produce and connect, and is thus very robust since both the tolerances and functionality of the radial and axial bearings are practically independent of each other. It is possible to arrange all components of the motor under the bell-shaped hub, including the fluid bearing system in particular, which is closed at the axial bearing end, the opposing open end being sealed by a capillary seal. Integration of the motor components in the hard disk drive is made simple by the usual means of bonding or press fitting the bearing bush into the sleeve provided in the baseplate, onto which the stator arrangement is also pressed or bonded.

Hard disk drives having greater storage capacity and thus a larger number of disks, four disks for example, or server drives having thicker storage disks and therefore a higher overall rotor mass, as well as generally increasing demands for precision and running smoothness due to greater data density have made it necessary to increase the stiffness of the overall motor system.

SUMMARY OF THE INVENTION

It is the object of the invention to improve a spindle motor, particularly the stiffness of a spindle motor, having a fluid dynamic bearing system as outlined at the start without departing from the basic concept of the single plate design or substantially changing the overall height.

This object has been achieved according to the invention by a spindle motor having the characteristics outlined in the independent claim.

Preferred embodiments and advantageous modifications of the invention are cited in the subordinate claims.

According to a first embodiment of the invention, a flange is molded onto the bearing bush that is made, for example, of steel, the flange being fixed in the opening in the baseplate so that the joint between the baseplate and the bearing bush is realized, for example, in the region below the outside diameter of the hub. The flange preferably has a distinctly larger diameter than the bearing bush and, like the bearing bush, is made of a material having an elasticity module of greater than 70 GPa, such as steel. The flange may also be made of a ceramic material, a plastic or a metal alloy. The greatest outside diameter of the flange is preferably greater than 1.5 times the outside diameter of the bearing bush. The flange has its largest outside in the joint region between the flange and the base plate.

According to another embodiment of the invention, the region of the baseplate in which the bearing bush is received and which is commonly diecast from aluminum, can be replaced by a flange ring made, for example, of steel which is pressed, welded or bonded to the bearing bush at its inside diameter and to the baseplate at its outside diameter.

The stiffness of a motor system is normally determined through appropriate vibration tests. The transfer function of the motor system for horizontal excitation in the frequency range of close to 500 Hz and the amplitude of the resonances that occur are determined. The stiffness of the motor system is increased by the formation of the flange on the bearing bush, which goes to dampen the deflection amplitude at 500 Hz and decrease the first resonant frequency, which for a conventional single plate design is usually lower than 2 kHz, or shift it to a higher frequency.

A detailed investigation of the overall motor system found that in the frequency range mentioned, the structural stiffness of the baseplate and the joint of the bearing bush to the baseplate have the greatest influence. Torque generated by horizontal accelerating forces at the rotor is transferred via the bearing system and the bearing bush to the baseplate. The greatest deformations thus occur in the region of the baseplate below the hub and the stator arrangement at the joint of the bearing bush and the sleeve. Providing added stiffness to the overall system without changing the predetermined outer dimensions can thus be best achieved through appropriate design measures in this region.

The use of a larger diameter flange to fasten the bearing bush makes it possible to increase the stiffness of the system without having to sacrifice the above-mentioned advantages of the single plate design, as is inevitably the case, for example, for motors having a stationary shaft (e.g. in a conical design having conical bearing surfaces) and without requiring any additional space for the motor, which would make integration in the hard disk drive more difficult and perhaps require costly changes to the overall system.

Another advantage of the invention is that the decline in overall stiffness caused by the normal joining methods used to connect the baseplate and the bearing bush, such as bonding or pressing, is greatly reduced or totally avoided since the connecting stiffness for the surface area of a larger diameter joint does not increase linearly.

The constructional concept of a spindle motor according to the invention is suitable for hard disk drives having a larger number of disks and thus a greater rotor mass and storage capacity. There is, moreover, and improvement in precision and running smoothness as well as in the stiffness of the overall motor system.

To date, devices for passive vibration damping have not been employed in spindle motors. The resonance amplitude of the mechanical vibrations is limited solely by the dissipation characteristics of the fluid used in the fluid bearing.

According to a further development of the invention, the amplitudes of the structural resonances can be effectively reduced by introducing discrete damping elements. To this effect in the various embodiments described above, a viscoelastic damping element is inserted, for example, at the joints between the bearing bush and the baseplate or the outside diameter of the flange ring or the bearing bush flange and the baseplate. A viscoelastic polymer foil is preferably used. This polymer foil typically has a thickness of 0.4 to 4 mil, i.e. around 10 to 100 µm and has an elasticity module of less than 1 GPa and a loss tangent of greater than 0.1.

The greater the deformation of the damping elements under the exertion of force, the greater is the efficiency of the intrinsic viscoelastic damping mechanism that applies here. It would therefore be ideal if the deformations were concentrated exclusively in the damping elements while the other motor components remained without deformation. To achieve this, it is necessary on the one hand to choose damping elements that have low stiffness and good damping characteristics. On the other hand, the rest of the motor structure should have the highest possible stiffness.

Instead of a flange at the outer diameter of the bearing bush there can be provided a sleeve at the base plate which receives the bearing bush at least partly. In the joint region between the sleeve and the baring bush there can be also arranged a damping element The distinctly improved overall stiffness made possible by the proposed design changes, the choice of suitable materials having a high elasticity module and, in particular, the much greater stiffness of the outer joint due to the enlarged outside diameter of the flange of the bearing bush, provide enough scope here for working with different connection thicknesses and materials for the damping elements.

The use of damping elements in the manner described above also enables a distinct reduction in acoustic noise emissions when the hard disks are in operation. The baseplate is de-coupled from the remaining vibrating part of the motor by means of the damping elements, so that the motor then hardly emits any sound into the environment.

Compared to a conventional single plate design, all the embodiments of the invention presented here require relatively low expenditure, i.e. they generate only insignificant additional costs, without any sacrifice of the above-mentioned advantages but at the same time bringing great benefits with respect to the demands as described above.

It is clear that the various embodiments described above can also be used for spindle motors and hard disk drives of a different size in order to improve the transfer function or, without diminishing this function, to decrease the dimensions of the baseplate or the overall height of the motor.

As indicated at the start, the bearing fluid has been the only effective damping element in motors to date. When air bearings are used, other damping characteristics of the bearing may have to be taken into account. The availability of additional damping elements could then be a significant advantage at times.

DESCRIPTION OF PREFERRED
EMBODIMENTS OF THE INVENTION

Figure 1:
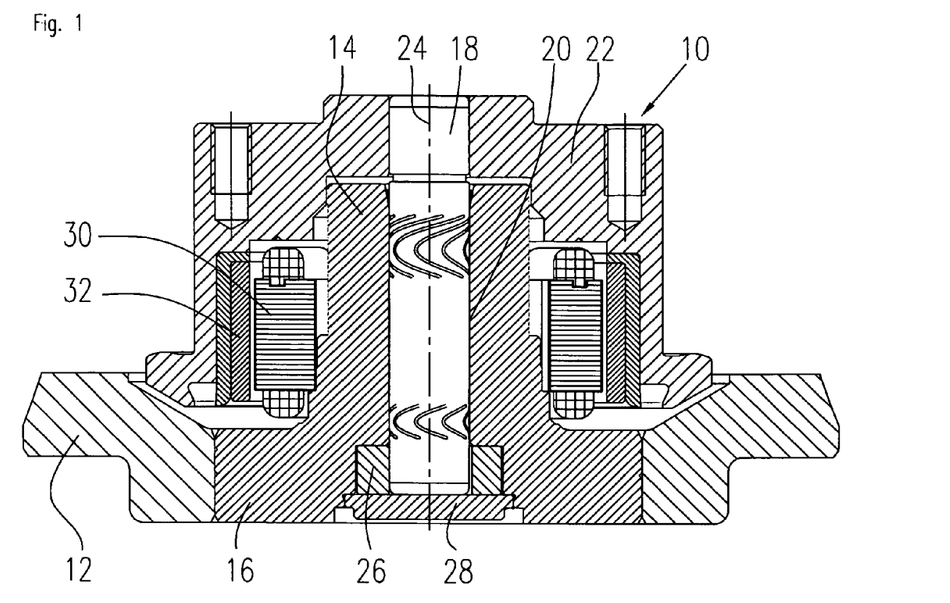
FIG. 1 shows a section through a first embodiment of a spindle motor having a widened, flange-like bearing bush.

The spindle motor 10 illustrated in FIG. 1 comprises a baseplate 12 having a substantially central opening into which a bearing bush 14 is inserted which is connected to the baseplate 12 by such means as pressing, bonding or welding. The bearing bush 14 has an axial bore to receive a shaft 18, an annular, concentric bearing gap 20 remaining between the inside diameter of the bore and the outside diameter of the shaft 18, the bearing gap 20 being filled with a bearing fluid, such as oil. The shaft 18 can thus freely rotate in the stationary bearing bush 14 and, together with the bearing bush, forms a fluid dynamic radial bearing in the conventional way.

A hub 22, on which, for example, one or more storage disks (not illustrated) of a hard disk drive are arranged, is fixed to the free end of the shaft 18. Displacement of the bearing arrangement along the rotational axis is prevented by appropriately designed fluid dynamic axial bearings. The fluid dynamic axial bearings are preferably formed by the two end faces of a thrust plate 26 preferably disposed at one end of the shaft 18, one end face of the thrust plate 26 being associated with the corresponding end face of the bearing bush 14 and the other end face being associated with the inside end face of a cover plate 28. The cover plate 28 forms a counter bearing to the thrust plate 26 and closes the open end of the bearing system and prevents air from penetrating into the bearing gap 20 filled with bearing fluid and from bearing fluid leaking out. The motor is driven by an electromagnetic drive system that substantially comprises a stator arrangement 30 disposed on the stationary part of the motor and a permanent magnet 32 disposed on the hub.

According to the invention, the bearing bush 14 is not perfectly cylindrical in shape, but rather has a widening at one of its ends taking the form of an annular flange 16. The bearing bush 14 is fixed with the flange 16 in an appropriately dimensioned opening in the baseplate 12. Here, such well-known means of connection as pressing, bonding or welding can find application. The greatest diameter of the flange 16, measured in the joint region between the flange 16 and the base plate 12, is at least 1.5 times the outside diameter of the bearing bush 14. In the illustrated embodiment, the diameter of the flange 16 is almost the same as the diameter of the hub 22. The larger the diameter of the flange and thus the effective surface area of the joint between the baseplate 12 and the flange 16, the greater is the connecting stiffness between the two parts.

Figure 2:
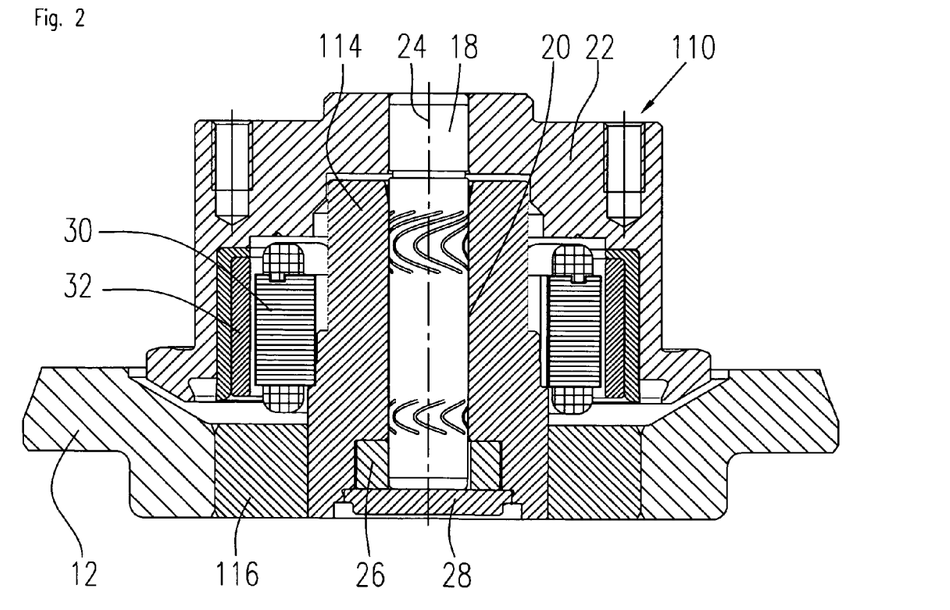
FIG. 2 shows a section through a second embodiment of a spindle motor having a flange ring between the bearing bush and the baseplate.

FIG. 2 shows a spindle motor 110 with substantially the same construction as that in FIG. 1 in which the flange is not formed integrally with the bearing bush 114 but rather as a flange ring 116. The flange ring 116 is preferably made of steel, as is the bearing bush 114, and is connected to the bearing bush 114 at its inside diameter and with the baseplate 12 at its outside diameter. Compared to FIG. 1, this embodiment has the advantage that the bearing bush 114 and the flange ring 116 can be manufactured more simply and at lower cost. However, the stiffness that can be achieved is not as high as with the spindle motor according to FIG. 1. The outside diameter of the flange ring 116 is considerably larger than the diameter of the bearing bush 114, but at least 1.5 times larger.

Figure 7:
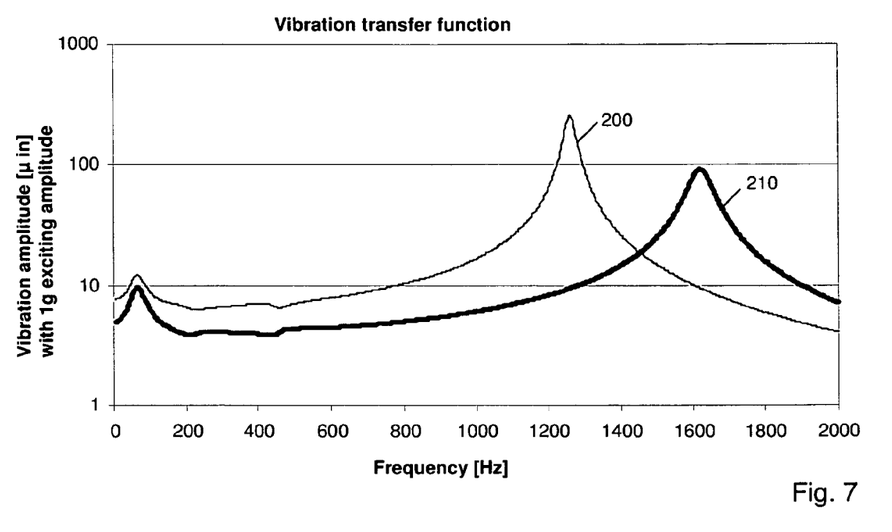
FIG. 7 shows a comparison of the vibration transfer function of a spindle motor according to the prior art and a spindle motor according to the invention in accordance with FIG. 1.

FIG. 7 shows a comparison of the vibration transfer functions in the frequency range of 0 to 2000 Hz of a spindle motor according to the prior art and a spindle motor 10 according to the invention in accordance with FIG. 1. The vibration transfer curve 200 of a conventional spindle motor shows a distinct resonance peak at a frequency of approximately 1250 Hz. In the case of the design according to the invention, represented by the vibration transfer curve 210, the resonance peak shifts to a frequency of approximately 1600 Hz with the vibration amplitude decreasing by about half, thus resulting in considerably greater stiffness.

Figure 3:
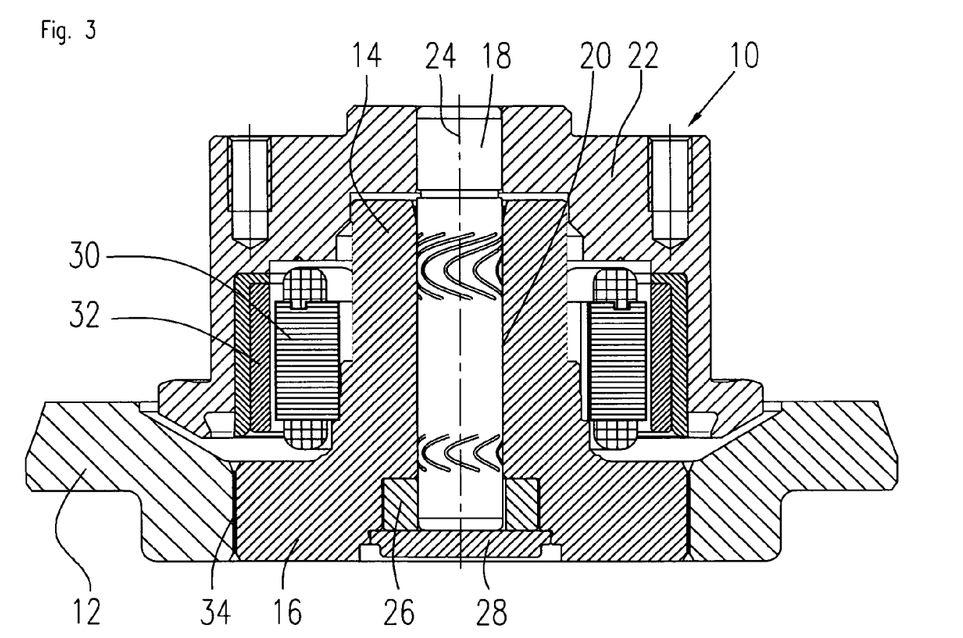
FIG. 3 shows a section through a third embodiment of a spindle motor having a widened, flange-like bearing bush and inserted damping elements.

FIG. 3 shows a spindle motor 10 which is almost identical to the spindle motor shown and described in FIG. 1. Reference is thus made to FIG. 1 for the description of this motor, identical parts being indicated by the same reference numbers. In contrast to FIG. 1, in the spindle motor 10 according to FIG. 3, the flange 16 is not directly connected to the baseplate 12, but rather a viscoelastic damping element 34 is inserted, bonded for example, in the area of the joint between the flange 16 and the baseplate 12. The damping element 34 is preferably a viscoelastic polymer foil having a thickness of preferably 10 to 100 μm.

The damping element 34 de-couples the baseplate 12 from the remaining parts of the motor, thus greatly reducing the vibration transfer between the base plate and the motor components.

Figure 4:
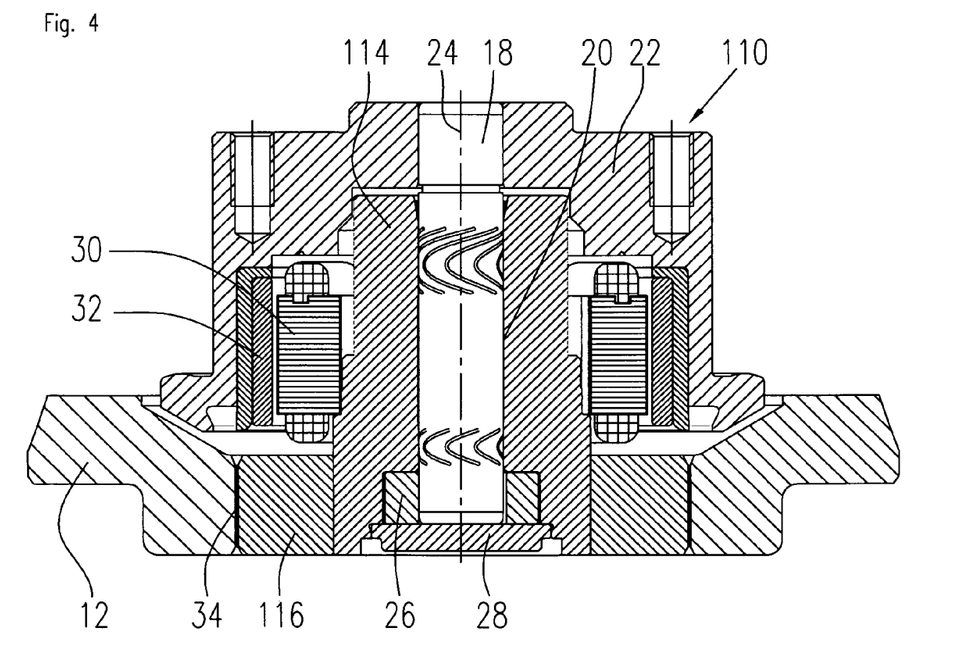
FIG. 4 shows a section through a fourth embodiment of a spindle motor having a flange ring between the bearing bush and the baseplate and a damping element at the outside diameter of the flange ring.

FIG. 4 shows a spindle motor 110, which is almost identical to the spindle motor shown and described in FIG. 2. Reference is thus made to FIG. 2 for the description of this motor 110, identical parts being indicated by the same reference numbers. In contrast to FIG. 2, in the spindle motor 110 according to FIG. 4, the flange ring 116 is not directly connected to the baseplate 12 but rather a viscoelastic damping element 34 is inserted, bonded for example, in the area of the joint between the flange ring 116 and the baseplate 12. As already described in conjunction with FIG. 3, the damping element 34 is a viscoelastic polymer foil having a thickness of preferably 10 to 100 μm. The damping element 34 de-couples the baseplate 12 from the remaining parts of the motor, thus greatly reducing the vibration transfer.

Figure 8:
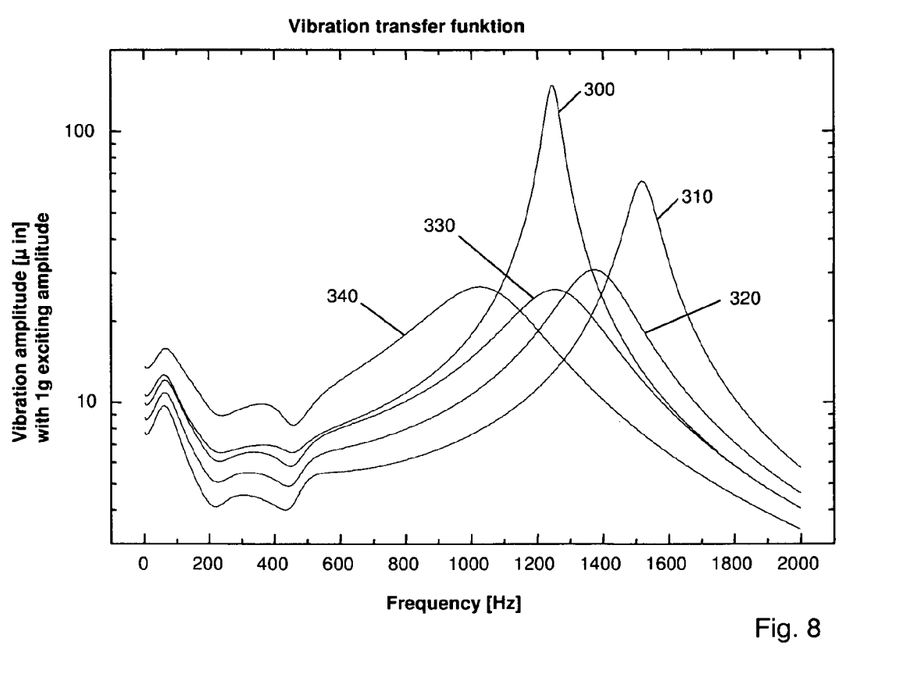
FIG. 8 shows a comparison of the vibration transfer function of a conventional spindle motor and a spindle motor according to the invention in accordance with FIG. 3 without a damping element and with damping elements of different thicknesses.

FIG. 8 shows a comparison of the vibration transfer functions in the frequency range of 0 to 2000 Hz of a conventional spindle motor and a spindle motor according to the invention in accordance with FIG. 1 without a damping element and in accordance with FIG. 3 with damping elements of various thicknesses.

Compared to the vibration transfer function 300 of a conventional spindle motor according to the prior art, the spindle motor according to FIG. 3 shows, even without damping elements, a vibration transfer function 310 with a distinct shift in the resonance frequency from approximately 1250 Hz to over 1500 Hz, as well as a reduction in the vibration amplitude of about half.

If a damping element 34 with a thickness of 10 μm is inserted between the flange 10 and the baseplate 12, vibration transfer function 320 is produced. It can be seen that compared to curve 310, the acceleration values are reduced again by half and the resonance frequency shifts to approximately 1400 Hz. The vibration transfer function 330 of a spindle motor having a damping element 34 with a thickness of 20 μm shows a further decline in the acceleration amplitudes and a shift in the resonance frequency to lower values. An even thicker damping element of 50 μm does not bring any substantial improvement on the previous values as can be seen from vibration transfer function 340.

Figure 5:
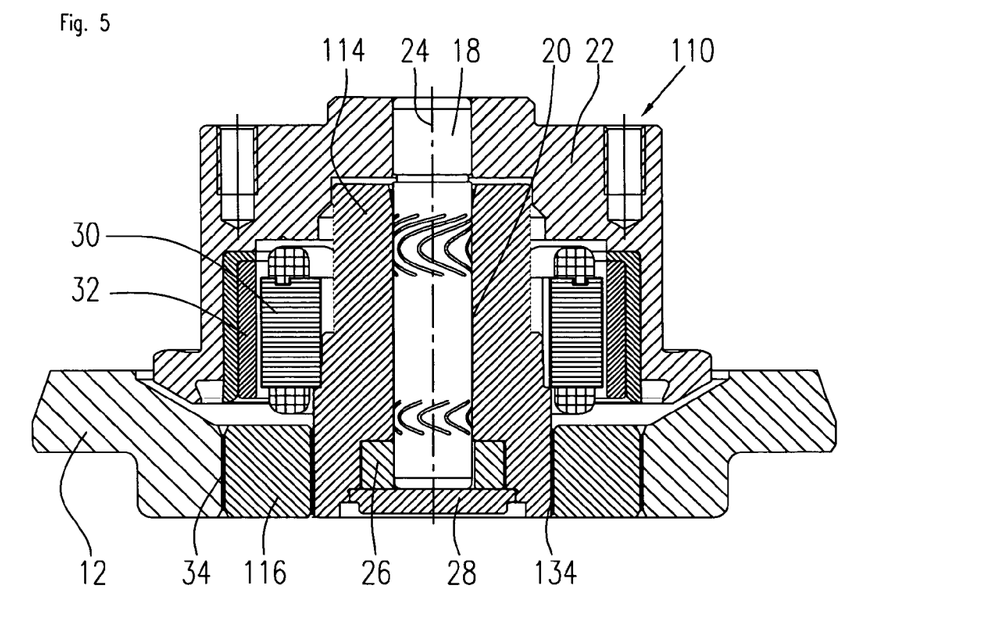
FIG. 5 shows a section through a fifth embodiment of a spindle motor having a flange ring between the bearing bush and the baseplate and damping elements at the inside and at the outside diameter of the flange ring.

FIG. 5 shows a section through a fifth embodiment of a spindle motor 110 that corresponds to the spindle motor of FIG. 4. The flange ring 116 is disposed between the bearing bush 113 and the baseplate 12. Damping elements 34 and 134 are provided between the outside diameter of the flange ring 116 and the baseplate 12 and additionally between the inside diameter of the flange ring 116 and the bearing bush.

Figure 6:
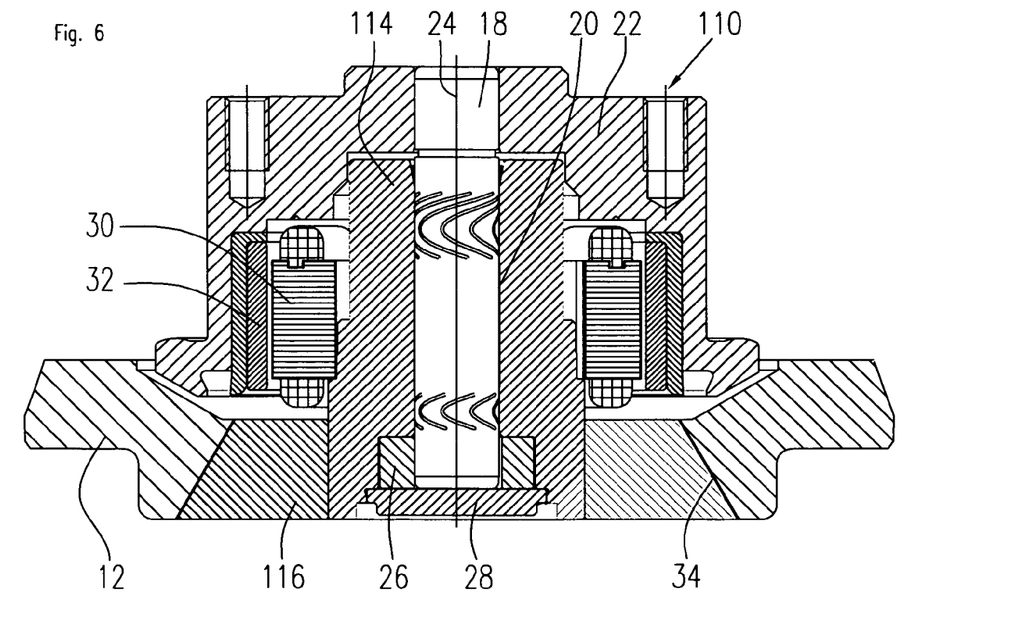
FIG. 6 shows a section through a sixth embodiment of a spindle motor having a flange ring between the bearing bush and the baseplate and a damping element at the conically tapered outside diameter of the flange ring.

FIG. 6 shows a further embodiment of the invention in which the joint between the baseplate 12 and the flange 116 is given a conical shape so that the flange 116 can be pressed from below against the baseplate 12. The damping element 34 then connects the two parts 12 and 116. This construction allows the baseplate 12, damping element 34 and flange ring 116 to be easily assembled and connected. In a similar manner, the joint between the flange ring 116 and the bearing bush 114 can also be given a conical shape and these surfaces also connected with a damping element.

Figure 9:
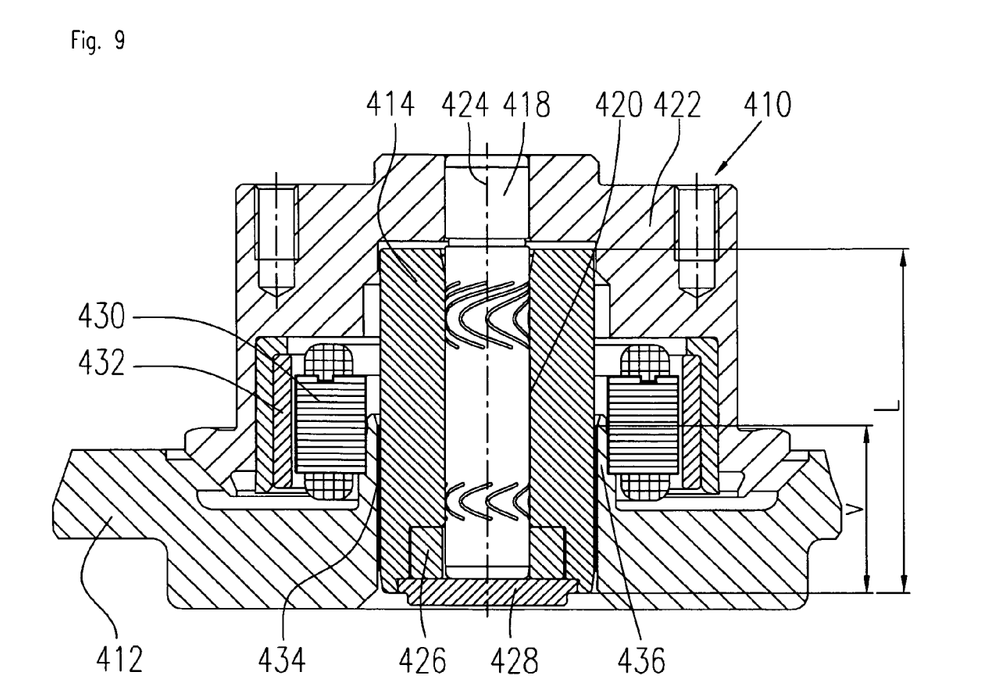
FIG. 9 shows a section through a seventh embodiment of a spindle motor having a damping element between a substantially cylindrical bearing bush and the base plate.

FIG. 9 shows a section through a seventh embodiment of a spindle motor 410 comprising a baseplate 412 having a substantially central opening into which a bearing bush 414 is inserted which is connected to the baseplate 412 by such means as pressing, bonding or welding. The bearing bush 414 has an axial bore to receive a shaft 418, an annular, concentric bearing gap 420 remaining between the inside diameter of the bore and the outside diameter of the shaft 418, the bearing gap 420 being filled with a bearing fluid, such as oil. The shaft 418 can thus freely rotate in the stationary bearing bush 414 and, together with the bearing bush, forms a fluid dynamic radial bearing in the conventional way.

A hub 422, on which, for example, one or more storage disks (not illustrated) of a hard disk drive are arranged, is fixed to the free end of the shaft 418. Displacement of the bearing arrangement along the rotational axis is prevented by appropriately designed fluid dynamic axial bearings. The fluid dynamic axial bearings are preferably formed by the two end faces of a thrust plate 426 preferably disposed at one end of the shaft 418, one end face of the thrust plate 426 being associated with the corresponding end face of the bearing bush 414 and the other end face being associated with the inside end face of a cover plate 428. The cover plate 428 forms a counter bearing to the thrust plate 426 and closes the open end of the bearing system and prevents air from penetrating into the bearing gap 420 filled with bearing fluid and from bearing fluid leaking out. The motor is driven by an electromagnetic drive system that substantially comprises a stator arrangement 430 disposed on the stationary part of the motor and a permanent magnet 432 disposed on the hub.

According to the invention, the base plate 412 comprises a projection on form of a sleeve 436 which defines an opening. The bearing bush 414 is fixed in the opening of the sleeve 436. Here, such well-known means of connection as pressing, bonding or welding can find application. According to the invention, the connection length V between the bearing bush 414 and the sleeve 436 compared to the overall length L of the bearing bush 414 is:

$V >= L/3$, and preferably $V >= L/2$.

The bearing bush 414 is not directly connected to the sleeve 436 of the base plate 412, but rather a viscoelastic damping element 434 is inserted, bonded for example, in the area of the joint between the bearing bush 414 and the sleeve 436. The damping element 434 is preferably a viscoelastic polymer foil having a thickness of preferably 10 to 100 μm.

The "soft", easily deformable damping element 434 allows a large connection length V, thus achieving a high stiffness of the joint between bearing bush 414 and the sleeve of the base plate 412. At the same time good damping performance is achieved because of the large joint face between the bearing bush 414 and the sleeve 436 of the base plate 412.

IDENTIFICATION REFERENCE LIST

10 Spindle motor
12 Baseplate
14 Bearing bush
16 Flange
18 Shaft
20 Bearing gap
22 Hub
24 Rotational axis
26 Thrust plate
28 Cover plate
30 Stator arrangement
32 Permanent magnet
34 Damping element
110 Spindle motor
114 Bearing bush
116 Flange ring
134 Damping element
200 Vibration transfer curve
210 Vibration transfer curve
300 Vibration transfer curve
310 Vibration transfer curve
320 Vibration transfer curve
330 Vibration transfer curve
340 Vibration transfer curve
410 Spindle motor
412 Baseplate
414 Bearing bush
418 Shaft
420 Bearing gap
422 Hub
424 Rotational axis
426 Thrust plate
428 Cover plate
430 Stator arrangement
432 Permanent magnet
434 Damping element
436 Sleeve

The invention claimed is:

1. A spindle motor (10; 110) having a fluid dynamic bearing system, having a baseplate (12), a stationary bearing bush (14; 114) disposed in an opening in the baseplate, a shaft (18) rotatably supported in an axial bore in the bearing bush by means of the fluid dynamic bearing system, a hub (22) connected to the shaft, and an electromagnetic drive system (30, 32), characterized in that the bearing bush (14; 114) has a flange (16; 116) that is fixed in the opening in the baseplate (12) and whose outside diameter is substantially larger than the outside diameter of the bearing bush, and that a damping element (34; 134) is disposed at a joint between the flange (16; 116) and the baseplate (12) and/or the flange (116) and the bearing bush (14; 114).

2. A spindle motor according to claim 1, characterized in that the outside diameter of the flange (16; 116) is at least 1.5 times the outside diameter of the bearing bush.

3. A spindle motor according to claim 1, characterized in that the outside diameter of the flange (16; 116) is substantially the same as the outside diameter of the hub (22).

4. A spindle motor according to claim 1, characterized in that the flange (16) is integrally formed with the bearing bush (14).

5. A spindle motor according to claim 1, characterized in that the flange 116 comprises a ring connected to the bearing bush (114).

6. A spindle motor according to claim 5, characterized in that at least one interface between the flange (16; 116) and the baseplate (12) and/or between the flange (116) and the bearing bush (114) is conical in shape.

7. A spindle motor according to claim 5, characterized in that the damping element (34) is disposed between the outside diameter of the flange (116) and the inside diameter of the opening in the baseplate (12).

8. A spindle motor according to claim 5, characterized in that the damping element (134) is disposed between the inside diameter of the flange (116) and the outside diameter of the bearing bush (114).

9. A spindle motor according to claim 1, characterized in that the flange (16; 116) is made of a material having an elasticity module E>=70 GPa.

10. A spindle motor according to claim 1, characterized in that the flange (16; 116) is made either of metal, of a metal alloy, of a ceramic material or of a plastic.

11. A spindle motor according to claim 1, characterized in that the damping element (34) is disposed between the outside diameter of the flange (16) and the inside diameter of the opening in the baseplate (12).

12. A spindle motor according to claim 1, characterized in that the damping element (34; 134) has a thickness of between 10 and 100 μm.

13. A spindle motor according to claim 1, characterized in that the damping element (34; 134) is made of a viscoelastic material.

14. A spindle motor according to claim 13, characterized in that the damping element is made of a viscoelastic polymer foil.

15. A spindle motor according to claim 1, characterized in that the damping element (34; 134) is connected to the flange and the baseplate or the bearing bush by means of bonding.

16. A spindle motor according to claim 1, wherein the fluid dynamic bearing system is configured to drive a storage disk of a hard disk drive.

* * * * *